United States Patent
Baskaran et al.

(10) Patent No.: US 10,095,434 B2
(45) Date of Patent: Oct. 9, 2018

(54) SYSTEMS AND METHODS FOR EFFICIENT DETERMINATION OF TASK DEPENDENCES AFTER LOOP TILING

(71) Applicant: Reservoir Labs, Inc., New York, NY (US)

(72) Inventors: Muthu M. Baskaran, Old Tappan, NJ (US); Thomas Henretty, Brooklyn, NY (US); Ann Johnson, Saratoga, CA (US); Athanasios Konstantinidis, Brooklyn, NY (US); M. H. Langston, New Windsor, NY (US); Janice O. McMahon, Bethesda, MD (US); Benoit J. Meister, New York, NY (US); Paul D. Mountcastle, Moorestown, NJ (US); Aale Naqvi, New York, NY (US); Benoit Pradelle, Brooklyn, NY (US); Tahina Ramananandro, New York, NY (US); Sanket Tavarageri, New York, NY (US); Richard A. Lethin, New York, NY (US)

(73) Assignee: RESERVOIR LABS, INC., New York, NY (US)

( * ) Notice: Subject to any disclaimer, the term of this patent is extended or adjusted under 35 U.S.C. 154(b) by 0 days.

(21) Appl. No.: 14/987,223

(22) Filed: Jan. 4, 2016

(65) Prior Publication Data

US 2016/0196122 A1 Jul. 7, 2016

Related U.S. Application Data

(60) Provisional application No. 62/099,345, filed on Jan. 2, 2015.

(51) Int. Cl.
*G06F 9/45* (2006.01)
*G06F 3/06* (2006.01)
*G06F 8/41* (2018.01)

(52) U.S. Cl.
CPC .......... *G06F 3/0631* (2013.01); *G06F 3/0604* (2013.01); *G06F 3/0638* (2013.01);
(Continued)

(58) Field of Classification Search
CPC .... G06F 3/0604; G06F 3/0631; G06F 3/0638; G06F 3/0671; G06F 8/4432; G06F 8/4441; G06F 8/453; Y02B 60/181
(Continued)

(56) References Cited

U.S. PATENT DOCUMENTS

| 6,374,403 | B1 * | 4/2002 | Darte | G06F 8/45 717/150 |
| 6,567,976 | B1 * | 5/2003 | Wolf | G06F 8/443 717/154 |

(Continued)

OTHER PUBLICATIONS

Ahmed et al., "Tiling Imperfectly-nested Loop Nests", 2000, IEEE, 14 pages.*
(Continued)

*Primary Examiner* — Ted T Vo
(74) *Attorney, Agent, or Firm* — Goodwin Procter LLP

(57) ABSTRACT

A compilation system can compile a program to be executed using an event driven tasks (EDT) system that requires knowledge of dependencies between program statement instances, and generate the required dependencies efficiently when a tiling transformation is applied. To this end, the system may use pre-tiling dependencies and can derive post-tiling dependencies via an analysis of the tiling to be applied.

16 Claims, 1 Drawing Sheet

```
for (i' = 1; i'<=16; i' += 2) {
  for (t1=0; t1 < 2; t1++) {
    S1: A[i'+t1] = f(i'+t1);
    for (j'=i+1; j' <=16; j' +=2) {
      for (t2=0; t2 < 2; t2++) {
        S2: x[i'+t1+1][j'+t2] = A[i'+t1];
      }
    }
  }
}
```

Listing 2

(52) U.S. Cl.
CPC .......... *G06F 3/0671* (2013.01); *G06F 8/4432* (2013.01); *G06F 8/4441* (2013.01); *G06F 8/453* (2013.01); *Y02D 10/41* (2018.01)

(58) Field of Classification Search
USPC .................................................. 717/151–161
See application file for complete search history.

(56) References Cited

U.S. PATENT DOCUMENTS

| | | | | |
|---|---|---|---|---|
| 7,398,484 | B2* | 7/2008 | Ruf ..................... | G06F 12/0897 711/101 |
| 2008/0250401 | A1* | 10/2008 | Puri ........................ | G06F 8/433 717/160 |

OTHER PUBLICATIONS

Punyamurtula et al., "Minimum Dependence Distance Tiling of Nested Loops with Non-uniform Dependences", 1994, IEEE, pp. 74-81.*

Baskaran et al, "Compiler-Assisted Dynamic Scheduling for Effective Parallelization of Loop Nests on Multicore Processors", 2009, (10 pages).

Brisebarre, et al., "Rigorous Polynomial Approximation using Taylor Models in Coq", TaMaDi project of the French ANR (ref. ANR-2010-BLAN-0203-01, Version 1, Dec. 19, 2011, (15 pages).

Chu et al, A Primal-Dual Operator Splitting Method for Conic Optimization, Electrical Engineering Department, Stanford University, Dec. 6, 2013, (24 pages).

Cohen et al, "CoqEAL—The Coq Elective Algebra Library" University of Gothenburg and Inria Sophia-Antipolis, Feb. 3, 2013 (29 pages).

Carbonell J. G. et al., "Lecture Notes in Artificial Intelligence: Subseries of Lecture Notes in Computer Science", 14th International Conference, LPAR 2007. Yerevan, Armenia, Oct. 15-19, 2007. (572 pages).

Cohen, C. et al., "Formal proofs in real algebraic geometry: from ordered fields to quantifier elimination", HAL, Feb. 16, 2012. (41 pages).

Darulova, E. et al., "Sound Compilation of Reals", POPL '14, Jan. 22-24, 2014. (14 pages).

Demmel, J. et al., "Lower Bounds on Algorithm Energy Consumption: Current Work and Future Directions", Electrical Engineering and Computer Sciences, University of California, Berkeley, Mar. 1, 2013. (24 pages).

Domahidi, A. et al., "ECOS: An SOCP Solver for Embedded Systems: 2013 European Control Conference (ECC):", Jul. 17-19, 2013, Zurich, Switzerland. (6 pages).

Giampapa, M. et al., "Experiences with a Lightweight Supercomputer Kernel: Lessons Learned from Blue Gene's CNK", IEEE, 2010. (10 pages).

Greengard, Leslie. "Fast Algorithms for Classical Physics", Science, vol. 265, Aug. 12, 1994. (7 pages).

Gupta, A. et al., "WSMP: Watson Sparse Matrix Package, Part 1—direct solution of symmetric systems, Version 18.01", IBM Research Report, Nov. 16, 2000. (52 pages).

Gupta, A. et al., WSMP: Watson Sparse Matrix Package, Part II—direct solution of general systems, Version 18.01:, IBM Research Report, Nov. 20, 2000. (39 pages).

Gupta, A. et al., "WSMP: Watson Sparse Matrix Package, Part III—iterative solution of sparse systems, Version 18.01", IBM Research Report, Nov. 5, 2007. (31 pages).

Gurobi Organization, "Gurobi Optimizer Reference Manual", 2017. (719 pages).

Kelner, J. et al., "A Simple, Combinatorial Algorithm for Solving SDD Systems in Nearly-Linerar Time", MIT, Jan. 28, 2013. (32 pages).

Konstantinidis, A. et al., "Parametric GPU Code Generation for Affine Loop Programs", Springer International Publishing, Switzerland, 2014. (16 pages).

Kulp, J., et al., "Open Component Portability Infrastructure (OPENCPI)", Mercury Federal Systems, Inc., Mar. 2013. (62 pages).

Langston, M. H., et al., "Re-Introduction of Communication-Avoiding FMM-Accelerated FFTs with GPU Acceleration," Reservior Labs, Inc., IEEE, 2013. (6 pages).

Langston, M.H., et al., "A Free-Space Adaptive FMM-Based PDE Solver in Three Dimensions", Jul. 2011. (28 pages).

Lashuk, I., et al., "A Massively Parallel Adaptive Fast Multipole Method on Heterogeneous Architectures", Communications of the ACM, vol. 55, No. 5, May 2012. (9 pages).

Lebret, H. et al., "Antenna Array Pattern Synthesis via Convex Optimization", IEEE Transactions on Signal Processing, vol. 45, No. 3, Mar. 1997. (7 Pages).

Leroy, X. "Formal Verification of a Realistic Compiler", Communications of the ACM, vol. 52, No. 7, Jul. 2009. (9 pages).

Li, D., et al., "Hybrid MPI/OpenMP Power-Aware Computing", IEEE, 2010. (12 pages).

Meister, B., et al., "SANE: An Array Language for Sensor Applications", Conference Paper, Nov. 2012. (7 pages).

Mountcastle, P.D., et al., "Compressive Sensing in Joint Angle-Frequency Domain", Reservoir Labs, Inc., Jan. 27, 2014. (11 pages).

Mountcastle, P.D., et al., "Generalized Adaptive Radar Signal Processing", Technology Service Corporation, Dec. 1, 2008. (8 pages).

Nieplocha, J., et al., "Advances, Applications, and Performance of the Global Arrays Shared Memory Programming Toolkit", The International Journal of High Performance Computing Applications, vol. 20, No. 2, Summer 2006, pp. 203-231.

O'Donoghue, B., et al., "Operator Splitting for Conic Optimization via Homogeneous Self-Dual Embedding", Dec. 11, 2013. (30 pages).

Park, J., et al., "Efficient Backprojection-based Synthetic Aperture Radar Computation with Many-core Processors," IEEE, SC12, Nov. 10-16, 2012. (11 pages).

Sleator, D., et al., "A Data Structure for Dynamic Trees", Journal of Computer and System Sciences, vol. 26, No. 3, Jun. 1983. (30 pages).

Sozeua, Matthieu, "Coq Reference Manual", Mar. 2018. (35 pages).

Spielman, D.A., et al., "A Local Clustering Algorithm for Massive Graphs and its Application to Nearly-Linear Time Graph Partitioning", Sep. 18, 2008. (25 pages).

Spielman, D.A., et al., "Nearly Linerar Time Algorithms for Preconditioning and Solving Symmetric, Diagonally Dominant Linear Systems", Siam J. Matrix Anal. Appl., vol. 35, No. 3, 2014. pp. 835-885.

Spielman, D.A., et al., "Nearly-Linear Time Algorithms for Graph Partitioning, Graph Sparsification, and Soloing Linear Systems,", Oct. 29, 2008. (54 pages).

Spielman, D.A., et al., "Spectral Sparsification of Graphs", Jul. 22, 2010. (49 pages).

Sturm, Jos F., "Using SeDuMi 1.02, a MATLAB toolbox for optimization over symmetric cones", Communications Research Laboratory, McMaster University, Hamilton, Canada, Aug. 1, 1998. (24 pages).

Suitesparse: A Suite of Sparse Matrix Software, website, date accessed: Apr. 26, 2018. available at: <http://faculty.cse.tamu.edu/davis/suitesparse.html> (2 pages).

Tak, P., et al., "A Framework for Low-Communication 1-D FFT" Intel Corporation, IEEE, SC12, Nov. 10-16, 2012. (12 pages).

Tarski's Theorem, Wolfram MathWorld, website, date accessed: Apr. 26, 2018. available at: <http://mathworld.wolfram.com/tarskistheorem.html. (1 page).

Tarski, Alfred, "Project Rand: A Decision Method for Elementary Algebra and Geometry," Rand Corporation, Aug. 1, 1948. (67 pages).

Toh, K.C., et al. "On the Implementation and usage of SDPT3—a MATLAB software package for semi-definite-quadratic-linear programming, version 4.0", Jul. 17, 2006. (46 pages).

(56) References Cited

OTHER PUBLICATIONS

Toh, K.C., et al., "SDPT3 Version 4.0—a MATLAB software for semidefinite-quadratic-linear programming", website, date accessed: Apr. 26, 2018. available at: <http://www.math.nus.edu.sg/~mattohkc/sdpt3.html>. (2 pages).

Ward, J. "Space-time Adaptive Processing for Airborne Radar", MIT, Lincoln Laboratory, Dec. 13, 1994. (179 pages).

Winter, S., et al., "On Real and Complex Valued L1-Norm Minimization for Overcomplete Bling Source Separation", NTT Communication Science Laboratories, IEEE, 2005. (4 pages).

\* cited by examiner

```
for (i = 1; i<=16; i++) {
  S1: A[i] = f(i);
  for (j=i+1; j <=16; j++) {
    S2: x[i][j] = A[i];
  }
}
```

Listing 1

FIG. 1

```
for (i' = 1; i'<=16; i' += 2) {
  for (t1=0; t1 < 2; t1++) {
    S1: A[i'+t1] = f(i'+t1);
    for (j'=i+1; j' <=16; j' +=2) {
      for (t2=0; t2 < 2; t2++) {
        S2: x[i'+t1+1][j'+t2] = A[i'+t1];
      }
    }
  }
}
```

Listing 2

FIG. 2

SYSTEMS AND METHODS FOR EFFICIENT DETERMINATION OF TASK DEPENDENCES AFTER LOOP TILING

CROSS-REFERENCE TO RELATED APPLICATIONS

This application claims benefit of priority to U.S. Provisional Patent Application Ser. No. 62/099,345 entitled "Systems and Methods for Software Optimization," filed on Jan. 2, 2015, the contents of which are incorporated herein by reference in their entirety.

FIELD OF THE INVENTION

This disclosure generally relates to systems and methods for efficient compilation of a program and, in particular, for efficient scheduling of several computation task specified in the program.

BACKGROUND

Task-based execution models depart from bulk-synchronized processing (BSP) models in that they express the exact amount of parallelism among tasks in a program. Instead of a sequence of doall-parallel tasks separated by barriers, the program represents the exact set of tasks that need to complete before the execution of a particular task to be semantically correct. The main advantages of task-based execution models are that they expose as much parallelism as possible and avoid BSP synchronizations, which may not scale well with the number of concurrent and irregular tasks, and when there is hardware induced load imbalance, such as in the context of Near Threshold Computing (NTC), where parameter-induced variation are estimated to cause core speeds to diverge by as much as four times.

The parallelizing compiler's job is to form tasks from a sequential specification of the program, and to compute dependences that relate these tasks to each other. Some compilers, e.g., R-Stream™, both tasks and their dependences can be represented in a compact form: a small set of polyhedrons is sufficient to represent the full set of tasks and their dependences, even when the number of such tasks and dependences depends upon runtime-defined parameters. This is enabled by the use of the polyhedral model, and the task and the dependence representation is compact compared with many other models in which each individual task is represented separately, as well as their dependences. Such a representation generally does not permit the representation of programs whose number of tasks would depend upon runtime parameters. However, a limitation that comes with the power of the polyhedral representation is the computational complexity of some of the algorithms for manipulating the polyhedrons that represent the program. Of interest in this section is polyhedral projection, which suffers from combinatorial explosion.

When a loop in a program to be compiled is tiled, the dependences between instances of statements in the tiled loop may need to be computed for execution using an event driven tasks (EDT) computing system. Some methods first form dependence relationships among pairs of tiled references. The dependence domain is expressed in the Cartesian product of the tiled iteration domains of the source and destination (polyhedral) statements. The task dependences are generally obtained by projecting out the inter-tile dimensions in both source and destination iteration spaces.

Unfortunately, this method does not scale well, because even though it applies well on the rational relaxation of the dependence domain, it relies on applying a projection operation on a high-dimensional polyhedron (the dependence domain). Projection is currently one of the least tractable operations on rational polyhedrons. For all practical purposes, the main parameter in the computation time of a polyhedral projection is the number of dimensions of the polyhedron. Unfortunately, the state of the art technique to compute task dependences relies on the formation and projection of a high-dimensional polyhedron. As a result, this technique can become impractical as it results in compilation timeouts.

SUMMARY

In various embodiments, the methods and systems described herein feature efficient techniques for computing task dependences that can dramatically reduce the complexity of computations. This is achieved in part, by dividing by up to two the dimensionality of the polyhedrons formed during dependence computation, and by avoiding the expensive projection step that pertains to many current techniques. Specifically, dependences computed prior to tiling are manipulated using the tiling operations to be applied to a loop, to determine post-tiling dependences.

Accordingly, in one aspect, a method for determining dependencies in a tiled loop nest includes performing by a processor the step of: obtaining: (i) a set of pre-tiling dependencies (D) corresponding to a statement in an un-tiled loop nest that includes a number of loop dimensions, and (ii) a tiling set (G) corresponding to a tiling scheme to be applied to the loop nest. The tiling scheme may introduce at least one tiled dimension corresponding to at least one loop dimension of the loop nest. The method also includes generating by the processor based on, at least in part, the set of pre-tiling dependencies (D), a set of modified pre-tiling dependencies (A), and also generating by the processor based on, at least in part, the tiling set (G), a set of compressed intra-tile dependencies (X). The method further includes compressing by the processor the set of modified pre-tiling dependencies (A) using the tiling set (G) to obtain a compressed set of modified pre-tiling dependencies (AG), and generating by the processor a set of post-tiling dependencies associated with the statement based on, at least in part, the compressed set and the set of compressed intra-tile dependencies (X).

The tiling set (G) may be represented as a matrix, where each column of the matrix is associated with a respective loop dimension to be tiled. In some embodiments, the tiling set (G) can be represented as a diagonal matrix. The set of pre-tiling dependencies may include a first relation corresponding to a first loop index that is associated with a first loop dimension. Generating the set of modified pre-tiling dependencies (A) may include representing the first relation in a form: an expression of the first loop index greater than or equal to zero.

Generating the set of modified pre-tiling dependencies (A) may be performed independently of the tiling set (G). Generating the set of compressed intra-tile dependencies (X) may also be performed independently of the set of pre-tiling dependencies (D). In some embodiments, generating the set of post-tiling dependencies includes performing a direct sum of the compressed set and the set of compressed intra-tile dependencies (X). In some embodiments, generating the set of post-tiling dependencies includes determining a set of vertices associated with the set of compressed intra-tile dependencies (X), and inflating at least one limit associated with the compressed set using at least one vertex in the set of vertices.

In another aspect, a system is provided for determining dependencies in a tiled loop nest. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The instructions in the first memory program the processing unit to obtain: (i) a set of pre-tiling dependencies (D) corresponding to a statement in an un-tiled loop nest that includes a number of loop dimensions, and (ii) a tiling set (G) corresponding to a tiling scheme to be applied to the loop nest. The tiling scheme may introduce at least one tiled dimension corresponding to at least one loop dimension of the loop nest.

The instructions also program the processing unit to generate, based on at least in part the set of pre-tiling dependencies (D), a set of modified pre-tiling dependencies (A) and, based on at least in part the tiling set (G), a set of compressed intra-tile dependencies (X). In addition, the instructions program the processing unit to compress the set of modified pre-tiling dependencies (A) using the tiling set (G) to obtain a compressed set of modified pre-tiling dependencies (AG), and to generate a set of post-tiling dependencies associated with the statement based on, at least in part, the compressed set and the set of compressed intra-tile dependencies (X). In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to determine dependencies in a tiled loop nest. The instructions may program the processing unit to obtain: (i) a set of pre-tiling dependencies (D) corresponding to a statement in an un-tiled loop nest that includes a number of loop dimensions, and (ii) a tiling set (G) corresponding to a tiling scheme to be applied to the loop nest. The tiling scheme may introduce at least one tiled dimension corresponding to at least one loop dimension of the loop nest.

The instructions may also program the processing unit to generate, based on at least in part the set of pre-tiling dependencies (D), a set of modified pre-tiling dependencies (A) and, based on at least in part the tiling set (G), a set of compressed intra-tile dependencies (X). In addition, the instructions may program the processing unit to compress the set of modified pre-tiling dependencies (A) using the tiling set (G) to obtain a compressed set of modified pre-tiling dependencies (AG), and to generate a set of post-tiling dependencies associated with the statement based on, at least in part, the compressed set and the set of compressed intra-tile dependencies (X). In various embodiments, the instructions can program the processing unit to perform one or more of the method steps described above.

BRIEF DESCRIPTION OF THE DRAWINGS

In the following description, various embodiments of the present invention are described with reference to the following drawings, in which:

FIG. 1 depicts an example program that can be tiled and executed; and

FIG. 2 depicts a tiled version of the program shown in FIG. 1, tiled according to a specified tiling scheme for which post-tiling dependencies are computed using pre-tiling dependencies, according to some embodiments.

DETAILED DESCRIPTION

We present a technical solution that does not require the computation of a high-dimensional dependence domain and, as such, embodiments of this technique are generally scalable. The presented technique relies on the knowledge of dependences as they stand before tiling is applied, and the sizes by which orthogonal tiling will be applied to the iteration domains. The main idea is to start with the pre-tiling dependences (i.e., among non-tiled iterations), and to derive the relationship between inter-tile iterations by expressing this relationship as a compression relationship.

If the diagonal matrix with positive diagonal elements G represents the orthogonal tiling transformation being applied to statement S of iteration vector I, we have:

$$I = GT + X \quad (1)$$

$$0 \leq X \leq \mathrm{diag}(G) - 1 \quad (2)$$

where T represents the inter-tile dimensions and X the intra-tile.

We start from a pre-tiling dependence $\Delta(I_s, I_t)$ and from tiling relationships as defined in (1) for two statements s, t, and we would like to infer a relationship $\Delta_T$ between $T_s$ and $T_t$ such that:

$$\Delta(I_s, I_t)^T \Rightarrow \Delta_T(T_s, T_t)^T \quad (3)$$

To do so, we notice that (1) can also be written as:

$$T = G^{-1}I - G^{-1}X, \quad (4)$$

Also, since G is invertible, (2) can be written as:

$$0 \leq G^{-1}X \leq \frac{\mathrm{diag}(G) - 1}{\mathrm{diag}(G)}$$

which we denote more concisely as (note the minus, introduced for convenience):

$$-G^{-1}X \in U \quad (5)$$

We consider the combined compression transformation G which applies $G_s$ to the $I_s$ space and $G_t$ to the $I_t$ space, and write:

$$-G^{-1}(X_s, X_t)^T \in U_{s,t} \quad (6)$$

Again since G is invertible, we define $P = G^{-1}\Delta$ and we have:

$$G^{-1}(I_s, I_t)^T \in P \quad (7)$$

From (6) and (7), we have:

$$(I_s, I_t)^T \in \Delta \Leftrightarrow (G^{-1}(I_s, I_t)^T - G^{-1}(X_s, X_t)^T) \in P \oplus U_{s,t}$$

where $\oplus$ denotes the polyhedral direct sum. We then have from (4):

$$(I_s, I_t)^T \in \Delta \Leftrightarrow (T_s, T_t)^T \in P \oplus U_{s,t} \quad (8)$$

$$\Delta_T = P \oplus U_{s,t} \quad (9)$$

A potential issue with defining the task dependence domain as the direct sum of a polyhedron with a hyper-rectangle is that it can result in a polyhedron with many vertices. Therefore, some embodiments feature a cheaper (i.e., computationally less intensive) constraints-oriented way of computing a slight over-approximation of this particular type of direct sums, as described below.

Preventing vertex explosion: The following technique for reducing vertices in the task dependence polyhedron. It relies on slightly shifting the constraints of P outwards, until the modified P contains all the points of P⊕$U_{s,t}$. We call this operation an inflation of P w.r.t $U_{s,t}$. As stated above, the U polyhedron defined in Equation (5) can be written (in the T space) as:

$$-\frac{g_i - 1}{g_i} \leq T_i \leq 0$$

U is a hyper-rectangle. Its vertices are defined by (g'), where $$g'_i = \begin{cases} 0 \text{ or} \\ -\frac{g_i - 1}{g_i} \end{cases}$$

Consider a constraint of P, written as aT+b≥0, where b may contain parametric expressions. We are looking for an offset c such that aT+b+c≥0 contains all the points of P⊕U. In other words, $$a(T+(g'))+b+c\geq 0 \Leftrightarrow aT+a(g')+b+c\geq 0$$

This relationship is respected whenever c≥−a(g'). The maximum value for the right-hand side occurs when $$g'_i = \frac{g_i - 1}{g_i}$$

whenever $a_i$ is positive. Hence the maximum required value for c is:

$$c_{max}(a) = \sum_i a_i \cdot g_{a,i}, \text{ where } g_{a,i} = \begin{cases} \frac{g_i - 1}{g_i} & \text{if } a_i > 0 \\ 0 & \text{otherwise} \end{cases}$$

The inflated polyhedron is then determined by replacing the constant offset b with b+$c_{max}$(a) for every constraint of P. The U considered here is $U_{s,t}$. Since the inflated task dependence polyhedron is obtained only by shifting constraints of P, it has the exact same combinatorial structure, i.e., we haven't introduced any vertices or constraints through inflation.

Exceptions

Two special cases may occur in tiling: First, a loop dimension may be untiled, i.e., the tile size is 1. This case, which happens for instance when a loop is not tilable, can be processed by the technique presented here, which gives $g_i$=1. Second, a loop dimension may be "fully tiled", i.e., all iterations of the original loop dimension become intra-tile iterations. This can happen for instance in the case of "small loops," where innermost small loops are taken out of the set of loops being tiled. This corresponds to $g_i$=0, i.e., one dimension (say k) is expressed as $i_k$=$x_k$ in Equation (1). The constraints of Equation (2) do not hold on $x_k$ in this case. In some embodiments, they can instead, be replaced by the constraints that hold on $i_k$. One problem with this method is that $U_{s,t}$ stops being a hyper-rectangle, and the inflation method requires to actually compute the vertices of $U_{s,t}$. In some embodiments, we resolve this by introducing an additional over-approximation of the dependence, i.e., by considering that the "small loop" is in fact tiled by a factor greater than or equal to the small loop's (maximum) trip count. Small loops have by definition a bounded, small trip count, so this is generally feasible.

Example

Referring to FIG. 1, read-after-write dependences between the program statements S1 and S2 of Listing 1 can be described as:

D:{1<=i1<=16,1<=i2<=16,i<=j<=16,i1=i2}

Since i1, the instance of loop index i corresponding to the statement S1 is one and the same as i2, the instance of the loop index i corresponding to the statement S2, we can represent both i1 and i2 using one variable, i. We can then write a simpler representation of D as:

D:{1<=i<=16,i+1<=j<=16}

Now, suppose that we are to tile the (i,j) loops with a size of a tile (2,2), with (0,0) as a representative origin, which we can represent as the affine matrix G as:

$$G = \begin{bmatrix} 2 & 0 & 0 \\ 0 & 2 & 0 \\ 0 & 0 & 2 \end{bmatrix}$$

In this example, the numbers of the first column (2 0 0) correspond to the index i; the numbers of the second column (0 2 0) correspond to the index j; and the third column (0 0 0) represents the origin for tiling. The matrix G can be represented such that the numbers of rows correspond to loop indices. Listing 2 shown in FIG. 2 may be generated by a compiler after applying tiling according to G to Listing 1.

The tiled dependence domain of the statements S1 and S2 in Listing 2 is:

T={1<=2i'+t1<=16,2i'+t1+1<=2j'+t2<=16,0<=t1<=1, 0<=t2<=1} where i' and j' are the inter-tile dimensions respective to i and j, and t1 and t2 are the intra-tile dimensions respective to i and j. The dependences among tiles of S1 and tiles of S2 are characterized by the set of integer values of (i, j) in T, which is traditionally overapproximated by the projection of the tiled dependence domain onto the inter-tile dimensions (i,j). Thus, TD:{0<=2i<=15,1<=2j,i<=j<=8}.

As described above, the projection technique can be prohibitively expensive in practice. In some embodiments, we can compute TD using a compression of D along G, to which the half-open unit box U is later added. In general, we have:

(ij1)$^T$=G(i'j'1)$^T$

The superscript T represents the transpose operation. Using this equality, we can state:

A(ij1)^T>=0=>AG(i'j'1)^T>=0

The pre-tiling dependency set, as described above, is D: {1<=i<=16, i+1<=j<=16}. A set of relations, optionally represented as a matrix A in some embodiments, can be derived by stating the dependency relations of D in the form of constraints expression_of_index>=0. Thus, $1<=i$ can be expressed as $i-1>=0$. Thus, the dependency relations of D can be written as:

$i-1>=0$ $16-i>=0$ $j-i-1>=0$ $16-j>=0$

The matrix A can then be written as:

$$A = \begin{bmatrix} 1 & 0 & -1 \\ -1 & 0 & 16 \\ -1 & 1 & -1 \\ 0 & -1 & 16 \end{bmatrix}$$

In some embodiments, AG can then be computed as:

$$AG = \begin{bmatrix} 2 & 0 & -1 \\ -2 & 0 & 16 \\ -2 & 2 & -1 \\ 0 & -2 & 16 \end{bmatrix}$$

Next, AG can be written in the form of constraints as:

$2i-1>=0$ $-2i+16>=0$ $-2i+2j-1>=0$ $-2j+16>=0$

These constraints can be represented as dependency relations as: $1<=2i$; $2i<=16$; and $2i+1<=2j<=16$. In some embodiments, these relations can be reduced further by analyzing constants therein. For example, if $2i+1<=16$, $i<=15$. The dependency relation comp (D,G) can then be written as:

comp$(D,G)=\{1<=2i<=15, 2i+1<=2j<=16\}$

It should be understood that the above described procedure is one illustrative example of performing the operations represented by Equation (4). In general, other techniques for computing this equation are also within the scope of various embodiments.

In some embodiments, the set U can be obtained from G as follows. For the intra-tile indices t1 and t2, we have: $0<=t1<=1$ and $0<=t2<=1$, which can be expressed as:

$t1>=0$ $-t1+1>=0$ $t2>=0$ $-t2+1>=0$

Therefore, a matrix B can be written as:

$$B = \begin{bmatrix} 1 & 0 & 0 \\ -1 & 0 & 1 \\ 0 & 1 & 0 \\ 0 & -1 & 1 \end{bmatrix}$$

Therefore, a matrix $-B*G$ can be computed as:

$$-BG = \begin{bmatrix} -2 & 0 & 0 \\ 2 & 0 & -1 \\ 0 & -2 & 0 \\ 0 & 2 & -1 \end{bmatrix}$$

This matrix can be expressed in the form of constraints expression_of_index>=0 as:

$-2t1>=0$ $2t1-1>=0$ $-2t2>=0$ $2t2-1>=0$

From these constraints, dependence relations U can be derived as:

$-1<=2t1'<=0$ and $-1<=2t2'<=0$

Next, in some embodiments, comp (D,G)+U is computed as:

comp$(D,G)\{1<=2i<=15, 2i+1<=2j<=16\}$ $U=\{-1<=2i'<=0, -1<=2j'<=0\}$

In some embodiments, the dependence relations can be reduced by analyzing constants therein. For example, $1<=2i$ and $2i+1<=2j$ imply $2<=2j$; this can be combined with $-1<=2j$ to get $1<=2j$. Thus, from the polyhedral sum comp (D,G)+U, a post-tiling dependence relation can be computed as:

$TD':\{0<=2i<=15, 1<=2j, i<=j<=8\}$.

TD' represents post-tiling dependency relations computed using pre-tiling dependence relationships D, and without using the computationally expensive step of projection. TD' is same as TD, the post-tiling dependency relations computed using the projection technique.

In some embodiments, we can obtain an overapproximation of the dependence polyhedron TD (or TD') by inflating the constraints of comp (D, G). This can avoid the need to perform a direct sum described above. Thus, in some embodiments, instead of performing a direct sum, comp (D, G) is inflated using:

$U=\{-1<=2i'<=0, -1<=2j'<=0\}$

The vertices of U can be expressed as:

$v0:(0,0), v1:(0,-½), v2:(-½,0), v3:(-½,-½)$

Inflated comp (D, G) can then be computed from AG, as:

$2i-1+b0>=0$ $-2i+15+b1>=0$ $-2i+2j-1+b2>=0$ $-2j+16+b3>=0$

We then perform: (i, j)+v3. One or more of the other vertices may be explored, as well, in some embodiments. Inflating using v3 can be described as:

$$(i,j)+(-\frac{1}{2},-\frac{1}{2}) \text{ for } b0 =>$$

$$2i-2*\frac{1}{2}-1+b0>=0$$

$$2i-2+b0>=0$$

Comparing this with 2i—1>=0 yields b0=1, which yields 0<=2i. Other constraints can be inflated in a similar manner, yielding:

$$TD''=\{0<=2i<=15, 2i<=2j<=16\}$$

TD" includes TD, and has two more integer (i,j) points: (0,0) and (16,16). However, its shape is as simple as D and its computation in various embodiments is even faster than that of TD'.

It should be understood that the example above is illustrative only and that in general, loop nests having more than two dimensions, e.g. 3, 5, 7, 10, 14, etc., dimensions can be tiled. The tiling size can be different from 2, e.g., 4, 5, 10, 20, 100, 128, etc., and the tiling sizes across different dimensions can be different.

As discussed herein, dependency computation described herein, though it may involve matrix and set operations cannot be considered to be a mathematical concept. Such computation that takes into consideration a program structure in terms of pre-tiling dependencies and tiling transformations of the program, as described above, is also not merely performing generic computer and/or database operations and is also not mere data organization or reorganization.

Unlike any generic operations such as data transmission and reception, unlike usual computer functions such as storage and access of information, and unlike any mathematical or mental processes such as comparing and categorizing information, the unconventional operations involved in dependency computation, as described herein, are specifically orchestrated. Specifically, dependency computation described in various embodiments involves analysis of the specific tiling transforms to be applied, determination of certain intra-tile dependencies, and manipulation of pre-tiling dependencies, so as to determine post-tiling dependencies without requiring the projection technique. This can improve the performance of a computer while facilitating fast but correct execution of the program using a system having several processing units. These specific operations make the methods and systems for dependency computation limited and specialized techniques of improving compilers.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for determining dependencies in a tiled loop nest, the method comprising performing by a processor configured as a compiler, the steps of:
   receiving a program source code comprising an un-tiled loop nest;
   obtaining: (i) a set of pre-tiling dependencies (D) corresponding to a statement in the un-tiled loop nest comprising a plurality of loop dimensions, and (ii) a tiling set (G) corresponding to a tiling scheme to be applied to the loop nest, the tiling scheme introducing at least one tiled dimension corresponding to at least one loop dimension of the loop nest;
   generating based on, at least in part, the set of pre-tiling dependencies (D), a set of modified pre-tiling dependencies (A);
   generating based on, at least in part, the tiling set (G), a set of compressed intra-tile dependencies (X);
   compressing the set of modified pre-tiling dependencies (A) using the tiling set (G) to obtain a compressed set of modified pre-tiling dependencies (AG);
   generating a set of post-tiling dependencies associated with the statement based on, at least in part, the compressed set and the set of compressed intra-tile dependencies (X); and
   generating by the compiler, a schedule of operation of the statement according to the set of post-tiling dependencies, to facilitate parallelized execution of the program.

2. The method of claim 1, wherein the tiling set (G) is represented as a matrix, each column of the matrix being associated with a respective loop dimension to be tiled.

3. The method of claim 2, wherein the tiling set (G) comprises a diagonal matrix.

4. The method of claim 1, wherein:
   the set of pre-tiling dependencies comprises a first relation comprising a first loop index that is associated with a first loop dimension; and
   generating the set of modified pre-tiling dependencies (A) comprises representing the first relation in a form: an expression of the first loop index greater than or equal to zero.

5. The method of claim 1, wherein generating the set of modified pre-tiling dependencies (A) is performed independently of the tiling set (G).

6. The method of claim 1, wherein generating the set of compressed intra-tile dependencies (X) is performed independently of the set of pre-tiling dependencies (D).

7. The method of claim 1, wherein generating the set of post-tiling dependencies comprises performing a direct sum of the compressed set and the set of compressed intra-tile dependencies (X).

8. The method of claim 1, wherein generating the set of post-tiling dependencies comprises:
   determining a set of vertices associated with the set of compressed intra-tile dependencies (X); and
   inflating at least one limit associated with the compressed set using at least one vertex in the set of vertices.

9. A system for determining dependencies in a tiled loop nest, the system comprising:
   a first processor; and
   a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to implement a compiler to:
   receive a program source code comprising an un-tiled loop nest;
   obtain: (i) a set of pre-tiling dependencies (D) corresponding to a statement in the un-tiled loop nest comprising a plurality of loop dimensions, and (ii) a tiling set (G) corresponding to a tiling scheme to be applied to the loop nest, the tiling scheme introducing at least one tiled dimension corresponding to at least one loop dimension of the loop nest;
   generate based on, at least in part, the set of pre-tiling dependencies (D), a set of modified pre-tiling dependencies (A);
   generate based on, at least in part, the tiling set (G), a set of compressed intra-tile dependencies (X);
   compress the set of modified pre-tiling dependencies (A) using the tiling set (G) to obtain a compressed set of modified pre-tiling dependencies (AG);
   generate a set of post-tiling dependencies associated with the statement based on, at least in part, the compressed set and the set of compressed intra-tile dependencies (X); and
   generate by the compiler, a schedule of operation of the statement according to the set of post-tiling dependencies, to facilitate parallelized execution of the program.

10. The system of claim 9, wherein the processing unit is programmed to represent the tiling set (G) as a matrix, each column of the matrix being associated with a respective loop dimension to be tiled.

11. The system of claim 10, wherein the tiling set (G) comprises a diagonal matrix.

12. The system of claim 9, wherein:
the set of pre-tiling dependencies comprises a first relation comprising a first loop index that is associated with a first loop dimension; and
to generate the set of modified pre-tiling dependencies (A), the processing unit is programmed to represent the first relation in a form: an expression of the first loop index greater than or equal to zero.

13. The system of claim 9, wherein the processing unit is programmed to generate the set of modified pre-tiling dependencies (A) independently of the tiling set (G).

14. The system of claim 9, wherein the processing unit is programmed to generate the set of compressed intra-tile dependencies (X) independently of the set of pre-tiling dependencies (D).

15. The system of claim 9, wherein to generate the set of post-tiling dependencies, the processing unit is programmed to compute a direct sum of the compressed set and the set of compressed intra-tile dependencies (X).

16. The system of claim 9, wherein to generate the set of post-tiling dependencies, the processing unit is programmed to:
determine a set of vertices associated with the set of compressed intra-tile dependencies (X); and
inflate at least one limit associated with the compressed set using at least one vertex in the set of vertices.

* * * * *

UNITED STATES PATENT AND TRADEMARK OFFICE
CERTIFICATE OF CORRECTION

| | |
|---|---|
| PATENT NO. | : 10,095,434 B2 |
| APPLICATION NO. | : 14/987223 |
| DATED | : October 9, 2018 |
| INVENTOR(S) | : Muthu M. Baskaran et al. |

It is certified that error appears in the above-identified patent and that said Letters Patent is hereby corrected as shown below:

In the Specification

At Column 1, Line 14, insert:
-- STATEMENT OF GOVERNMENT SUPPORT
This invention was made with government support under Contract No. HR0011-12-C-0123 awarded by the Defense Advanced Research Projects Agency (DARPA). The government has certain rights in the invention. --

Signed and Sealed this
Twenty-sixth Day of July, 2022

*Katherine Kelly Vidal*

Katherine Kelly Vidal
*Director of the United States Patent and Trademark Office*